(12) United States Patent
Feng

(10) Patent No.: US 11,265,614 B2
(45) Date of Patent: Mar. 1, 2022

(54) INFORMATION SHARING METHOD AND DEVICE, STORAGE MEDIUM AND ELECTRONIC DEVICE

(71) Applicant: Tencent Technology (Shenzhen) Company Limited, Shenzhen (CN)

(72) Inventor: Zheng Feng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/857,594

(22) Filed: Apr. 24, 2020

(65) Prior Publication Data

US 2020/0252696 A1    Aug. 6, 2020

Related U.S. Application Data

(63) Continuation of application No. PCT/CN2018/118623, filed on Nov. 30, 2018.

(30) Foreign Application Priority Data

Nov. 30, 2017    (CN) .......................... 201711243211.8

(51) Int. Cl.
  *H04N 21/485*    (2011.01)
  *H04N 21/4782*    (2011.01)
  *H04N 21/488*    (2011.01)

(52) U.S. Cl.
  CPC ..... *H04N 21/4858* (2013.01); *H04N 21/4782* (2013.01); *H04N 21/4884* (2013.01)

(58) Field of Classification Search
  CPC ... G06F 1/1692; G06F 3/048–3/04897; H04N 21/4888; H04N 21/4884;
  (Continued)

(56) References Cited

U.S. PATENT DOCUMENTS 9,619,123 B1*  4/2017  Hughes ............. H04N 21/6581
2006/0179403 A1  8/2006  Kirkpatrick
(Continued)

FOREIGN PATENT DOCUMENTS

CN    104104990 A    10/2014
CN    105338394 A    2/2016
(Continued)

OTHER PUBLICATIONS

Tencent Technology, ISR, PCT/CN2018/118623, Mar. 5, 2019, 2 pgs.

(Continued)

*Primary Examiner* — John W Miller
*Assistant Examiner* — Humam M Satti
(74) *Attorney, Agent, or Firm* — Morgan, Lewis & Bockius LLP

(57) ABSTRACT

Embodiments of this application disclose an information sharing method performed at an electronic device. The electronic device obtains a first instruction of a target account at a first moment for obtaining a subtitle in a target video currently played on the client and displays a plurality of subtitles on the client. The plurality of subtitles are subtitles of the target video within a target playback time period covering the first moment at which the first instruction is obtained. Next, the electronic device obtains a second instruction of the target account for information sharing determines a to-be-shared first subtitle among the plurality of subtitles, and shares at least the first subtitle with at least another account of the social networking platform. The embodiments of this application resolve technical problems in the related art that a target subtitle cannot be accurately obtained.

20 Claims, 7 Drawing Sheets

(58) Field of Classification Search
CPC ........... H04N 21/4858; H04N 21/4782; H04N 21/4314; H04N 21/436; H04N 21/8456
See application file for complete search history.

(56) References Cited

U.S. PATENT DOCUMENTS

| | | | |
|---|---|---|---|
| 2008/0247726 A1* | 10/2008 | Lee ................. | G11B 27/34 386/282 |
| 2015/0046148 A1* | 2/2015 | Oh .................. | H04N 21/47 704/3 |
| 2016/0170709 A1* | 6/2016 | Jang ................. | G06F 3/167 715/727 |
| 2017/0011774 A1 | 1/2017 | Ju et al. | |
| 2018/0143956 A1* | 5/2018 | Skarbovsky ........ | G10L 15/26 |

FOREIGN PATENT DOCUMENTS

| | | |
|---|---|---|
| CN | 105338419 A | 2/2016 |
| CN | 105979288 A | 9/2016 |
| CN | 106295628 A | 1/2017 |
| CN | 108093310 A | 5/2018 |

OTHER PUBLICATIONS

Tencent Technology, WO, PCT/CN2018/118623, Mar. 5, 2019, 4 pgs.
Tencent Technology, IPRP, PCT/CN2018/118623, Jun. 2, 2020, 5 pgs.

* cited by examiner

INFORMATION SHARING METHOD AND DEVICE, STORAGE MEDIUM AND ELECTRONIC DEVICE

This application is a continuation application of PCT Application No. PCT/CN2018/118623, entitled "METHOD AND DEVICE FOR SHARING INFORMATION, STORAGE MEDIUM, AND ELECTRONIC DEVICE" filed on Nov. 30, 2018, which claims priority to Chinese Patent Application No. 201711243211.8, entitled "INFORMATION SHARING METHOD AND APPARATUS, STORAGE MEDIUM, AND ELECTRONIC DEVICE" filed Nov. 30, 2017, all of which are incorporated by reference in their entirety.

FIELD OF THE TECHNOLOGY

Embodiments of this application relate to the field of the Internet, and specifically, to an information sharing method and apparatus, a storage medium, and an electronic device.

BACKGROUND OF THE DISCLOSURE

With the development of science and technology, digitalization is getting deeper into life, and televisions (TVs) have also become smart in recent years, for example, a smart TV with an operating system (such as Android), or a smart TV based on a set-top box. Compared with a conventional TV, a smart TV currently available has the advantage of application platform, and provides various application services such as network search, IP TV, video on demand, and digital music.

The smart TV has greatly enriched people's digital lives. In addition to watching Internet programs through a video client on a computer device such as a computer or a mobile phone, the audience may also watch Internet programs through a smart TV. When the audience is watching a video through a smart TV, a web client, or an application client, lines in the video often leave a deep impression on the audience.

The audience may share the impressive lines through a share button provided by a video client. After a user clicks the button, the client generates a line (subtitle) to the user for sharing.

In the foregoing line-sharing operation, if a character in the video speaks fast, his/her lines are fleeting, and when the audience presses the share button, the client obtains a line displayed at the moment when the audience presses the share button, and finally pushes it to the audience. However, as time lapses, the line displayed by the client when the audience presses the share button may most likely not be the line that the audience wants to share. As a result, the client cannot accurately obtain a target line (a line or subtitle that the audience wants to share).

Currently, no effective solution has been proposed to resolve the technical problem in the related art that a target subtitle cannot be accurately obtained.

SUMMARY

Embodiments of this application provide an information sharing method and apparatus, a storage medium, and an electronic device, to resolve at least a technical problem in the related art that a target subtitle cannot be accurately obtained.

According to an aspect of the embodiments of this application, an information sharing method is provided. The method is performed by an electronic device, and includes: obtaining a first instruction of a target account of a social networking platform for information capturing at a first moment, the target account being an account used on a client associated with the electronic device, the first instruction being used for obtaining a subtitle in a target video currently played on the client; in response to the obtained first instruction, displaying a plurality of subtitles on the client, the plurality of subtitles being subtitles of the target video within a target playback time period, and the target playback time period covering the first moment at which the first instruction is obtained; and obtaining a second instruction of the target account for information sharing; in response to the obtained second instruction: determining a to-be-shared first subtitle among the plurality of subtitles; and sharing at least the first subtitle with at least another account of the social networking platform.

According to another aspect of the embodiments of this application, a non-transitory computer readable storage medium is further provided. The storage medium stores a plurality of program units that, when executed by an electronic device having one or more processors, cause the electronic device to perform the foregoing information sharing method.

According to another aspect of the embodiments of this application, an electronic device is provided. The electronic device includes one or more processors and one or more memories storing program units that, when executed by the one or more processors, cause the electronic device to perform the foregoing information sharing method.

In the embodiments of this application, after a first instruction of a target account is obtained, a plurality of subtitles are displayed on a client, the plurality of subtitles being subtitles of a target video within a target playback time period, and the target playback time period including a first moment to which the target video is played in a case that the first instruction is obtained; and a second instruction is obtained, a to-be-shared first subtitle is determined according to the plurality of subtitles, and at least the first subtitle (that is, a target subtitle) is shared, so that the technical problem in the related art that a target subtitle cannot be accurately obtained can be resolved, thereby achieving the technical effect of accurately obtaining a target subtitle.

BRIEF DESCRIPTION OF THE DRAWINGS

Accompanying drawings described herein are used to provide further understanding about the embodiments of this application and form a part of the embodiments of this application. Exemplary embodiments of this application and descriptions thereof are used to explain the embodiments of this application, and do not constitute an inappropriate limitation on the embodiments of this application. In the drawings.

DESCRIPTION OF EMBODIMENTS

To make a person skilled in the art understand solutions of the embodiments of this application better, the following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of the embodiments of this application.

In the specification, claims, and accompanying drawings of this application, the terms "first", "second", and so on are intended to distinguish between similar objects but do not necessarily indicate a specific order or sequence. It is to be understood that the data termed in such a way are interchangeable in proper circumstances so that the embodiments of this application described herein can be implemented in orders except the order illustrated or described herein. Moreover, the terms "include", "contain" and any other variations mean to cover the non-exclusive inclusion, for example, a process, method, system, product, or device that includes a list of steps or units is not necessarily limited to those units, but may include other units not expressly listed or inherent to such a process, method, system, product, or device.

According to an aspect of the embodiments of this application, a method embodiment of an information sharing method is provided.

Figure 1:
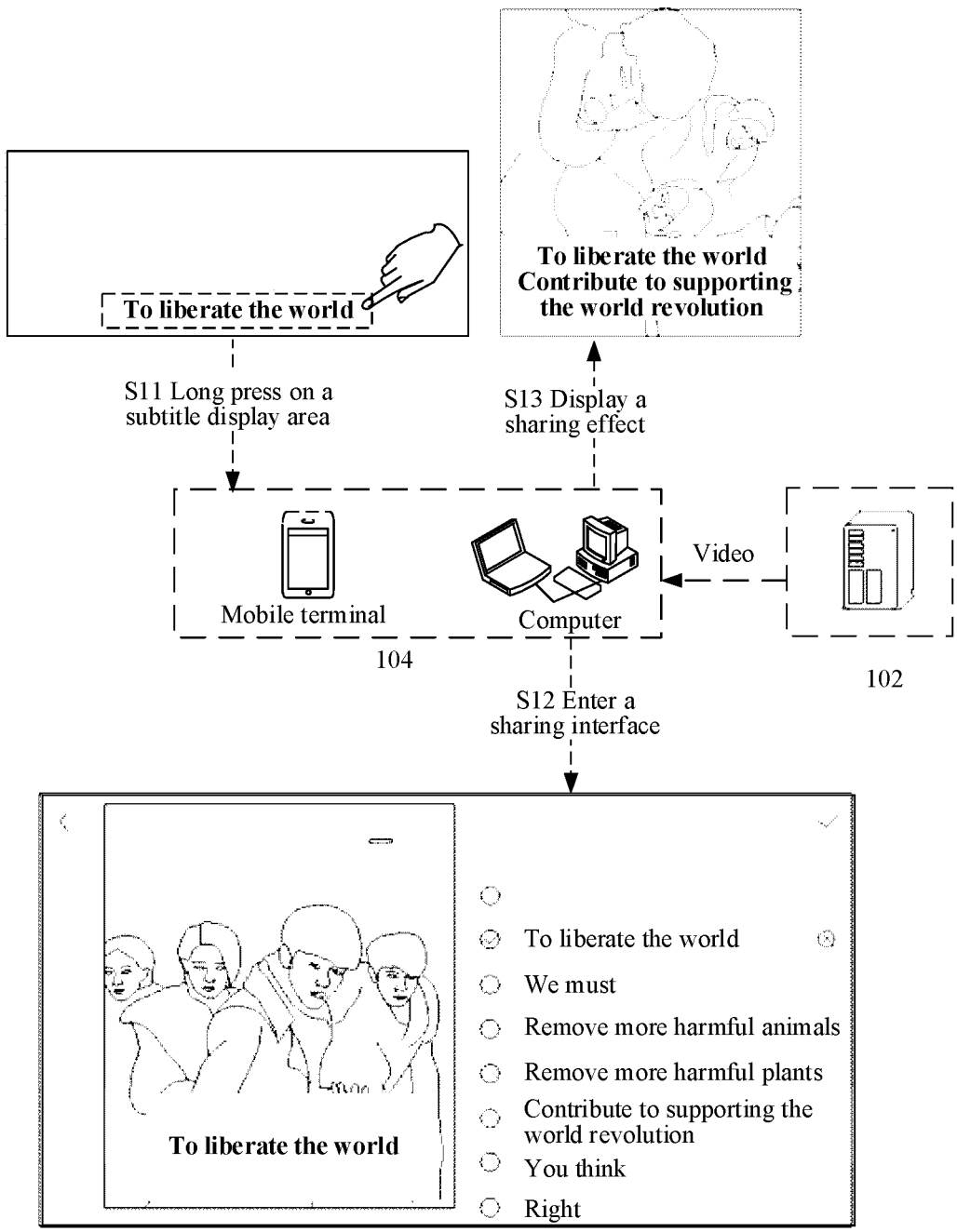
FIG. 1 is a schematic diagram of a hardware environment of an information sharing method according to an embodiment of this application.

Optionally, in this embodiment, the foregoing information sharing method may be applied to a hardware environment formed by a server 102 and a terminal 104 shown in FIG. 1. As shown in FIG. 1, the server 102 is connected to the terminal 104 through a network. The network includes, but is not limited to, a wide area network, a metropolitan area network, and a local area network. The terminal 104 is not limited to a PC, a mobile phone, a tablet computer, a TV remote control and the like. The information sharing method in this embodiment of this application may be performed by an electronic device, for example, may be performed by the server 102, or may be performed by the terminal 104, or may be jointly performed by the server 102 and the terminal 104. That the terminal 104 performs the information sharing method in this embodiment of this application may be that a client installed on the terminal 104 performs the information sharing method.

The foregoing client is a client for playing a video, and may be specifically a client of a video application, a web client, or a video client on a smart device such as a smart TV. The foregoing target account is an account that is allowed to be used on the client, for example, an account of the video application, an account (such as a social account or an instant messaging account) of another application, or a mobile phone number.

The following description is provided by using an example in which the information sharing method in the embodiments of this application is performed by an electronic device.

Step S11. In a case that a target video is played on a client, a target account may enter an information editing interface of the embodiments of this application in a specified manner, for example, by long pressing on a subtitle display area, clicking an edit button, or entering a specified gesture. The client may be installed on the foregoing electronic device.

Step S12. The electronic device edits a selected subtitle according to an instruction of the target account on the information editing interface, and enters a sharing interface after editing the subtitle. The target account may share edited target information to a specified path or channel through a share button on the sharing interface.

Optionally, step S12 may be implemented by the following sub-steps:

Step S121. The electronic device obtains a first instruction of a target account, the target account being an account used on a client, and the first instruction being used for instructing to obtain a subtitle in a target video currently played on the client.

Step S122. The electronic device displays, in response to the obtained first instruction, a plurality of subtitles on the client, the plurality of subtitles being subtitles of the target video within a target playback time period, and the target playback time period including a first moment to which the target video is played in a case that the first instruction is obtained.

Step S123. The electronic device obtains a second instruction, determines a to-be-shared first subtitle according to the plurality of subtitles, and shares at least the first subtitle, the second instruction being used for instructing to determine the to-be-shared first subtitle according to the plurality of subtitles.

Step S13. The electronic device displays the sharing effect or returns to a playback interface of the target video.

The above steps S11 to S13 are a complete implementation process including the technical solution of the embodiments of this application. The technical solution of the embodiments of this application mainly includes step S12. The technical solution of step S12 is described in detail below with reference to specific embodiments.

Figure 2:
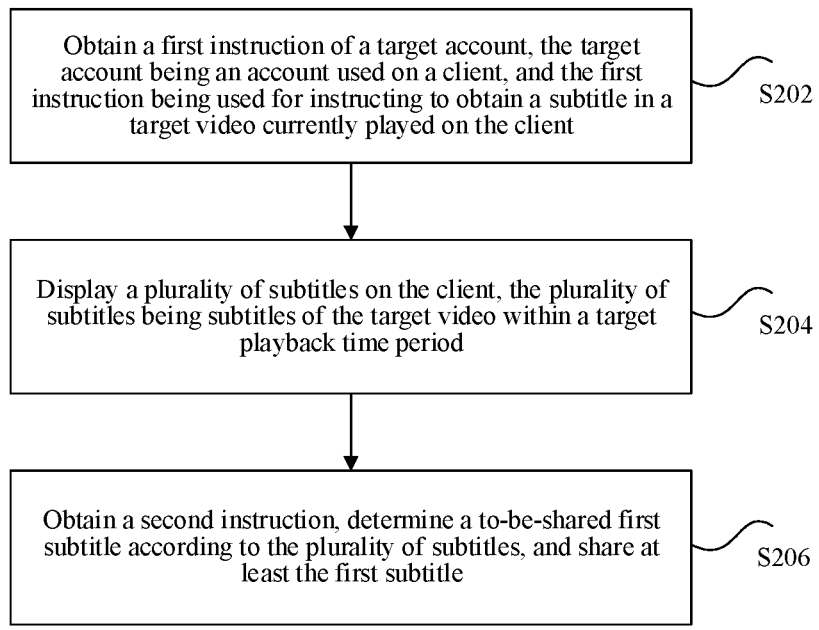
FIG. 2 is a flowchart of an optional information sharing method according to an embodiment of this application.

FIG. 2 is a flowchart of an optional information search method according to an embodiment of this application. The following description is provided by using an example in which the information sharing method in the embodiments of this application is performed by an electronic device. As shown in FIG. 2, the method may include the following steps:

Step S202. The electronic device obtains a first instruction of a target account, the target account being an account of a social networking platform used on a client associated with the electronic device, and the first instruction being used for instructing to obtain a subtitle in a target video currently played on the client. In a case that the target video is played on the client, the target account may trigger a first instruction through a trigger control provided by the client, for example, by long pressing on a subtitle display area, through a button on the client, or through a built-in gesture of the client or a gesture agreed upon by the client.

The foregoing subtitle (subtitle of motion picture) refers to non-image content such as dialogs in TV series, movies, and stage productions (that is, the target video) in text form, for example, narrative texts and various texts appearing in a lower part of a movie screen or TV screen, including lyrics, dialogs, and explanatory words having text information such as character introductions, place names and dates. The technical solution of the embodiments of this application is particularly applicable to dialog subtitles (also referred to as lines) of film and television works.

Step S204. Display, in response to the obtained first instruction, a plurality of subtitles on the client, and wait for a second instruction of the target account, the plurality of subtitles being subtitles of the target video within a target playback time period, and the target playback time period including a first moment to which the target video is played in a case that the first instruction is obtained.

In a case that the first instruction is obtained, the target account enters an editing interface, the plurality of subtitles are displayed on the editing interface, and the target account can edit the subtitles and other content through an editing control of the editing interface. Different editing controls may correspond to different instructions, for example, the second instruction is used for instructing to determine a to-be-shared first subtitle according to the plurality of subtitles.

The foregoing target playback time period may be a fixed time period (such as 1 second, 3 seconds, 5 seconds, or 10 seconds), and a position of the first moment in the time period may be determined according to configuration information, for example, may be a start position, an end position, or a middle position in the time period.

The foregoing target playback time period may be a time period with a fixed quantity of subtitles (such as 3, 5, or 10 subtitles), and a position of a subtitle displayed at the first moment in the plurality of subtitles may be determined according to configuration information, for example, may be a start position, an end position, or a middle position in the plurality of subtitles.

Step S206. The electronic device obtains the second instruction, determines a to-be-shared first subtitle according to the plurality of subtitles, and shares at least the first subtitle with at least another account of the social networking platform.

That is, in a case that the second instruction is obtained, the to-be-shared first subtitle is determined according to the plurality of subtitles, and at least the first subtitle is shared.

The foregoing first subtitle is determined after processing of the plurality of subtitles, and the processing includes selection, editing, and the like. Through configuring the target time period, the target account can obtain subtitles within a time period. Even if subtitles have changed (a subtitle that a first account is interested in has been skipped) when the target account triggers the first instruction, the plurality of subtitles that are finally displayed still include the subtitle that has flashed and that the first account is interested in, thereby avoiding the problem that a client cannot accurately obtain a target subtitle.

Through the above steps S202 to S206, after a first instruction of a target account is obtained, a plurality of subtitles are displayed on a client, the plurality of subtitles being subtitles of a target video within a target playback time period, and the target playback time period including a first moment to which the target video is played in a case that the first instruction is obtained; and a second instruction is obtained, a to-be-shared first subtitle is determined according to the plurality of subtitles, and at least the first subtitle (that is, a target subtitle) is shared, to resolve the technical problem in the related art that a target subtitle cannot be accurately obtained, thereby achieving the technical effect of accurately obtaining a target subtitle.

An embodiment of this application provides a solution for real-time sharing of video lines, and the foregoing technical solution of the embodiments of this application may be integrated on a client. The client may include three interfaces: an entrance interface, an editing interface, and a sharing channel interface. When watching a video and having a willingness to share lines that appear, the user may long press on a line display area to display the entrance interface and enter the editing interface. At the same time, the lines upon entry are selected by default, and the editing interface provides a list of lines, stills, and the like (that is, media information) for the user to edit independently. The lines may be edited, and a plurality of sentences (that is, a plurality of subtitles, such as six subtitles) may be corrected. Each line may be displayed in a plurality of rows according to a quantity of words, and all lines may be finally displayed in a plurality of rows (such as 12 rows). A program dynamically adjusts a font size according to a quantity of rows in which the lines are displayed (a larger quantity of rows indicates a smaller font size). The still may be rotated, moved, and scaled. The program finally rotates the still at 0 or 90 or 180 or 270 degrees according to an angle at which it is rotated by the user. The editing interface can improve the user's creative space. After finishing editing, the user clicks "finish" to execute transition animation to gently enter the sharing channel interface. After the user selects a channel, the sharing is completed.

According to the technical solution of the embodiments of this application, when the user watches a video and wants to share classic, meaningful or touching lines appearing in the video, the user can share the lines in combination with video scenes, without needing to memorize the lines and edit them manually, which greatly improves the user's willingness to share. The technical solution of the embodiments of this application is further described in detail below with reference to steps S202 to S206.

In the technical solution provided in step S202, the electronic device obtains a first instruction of a target account, the target account being an account used on a client, and the first instruction being used for instructing to obtain a subtitle in a target video currently played on the client.

Figure 3:
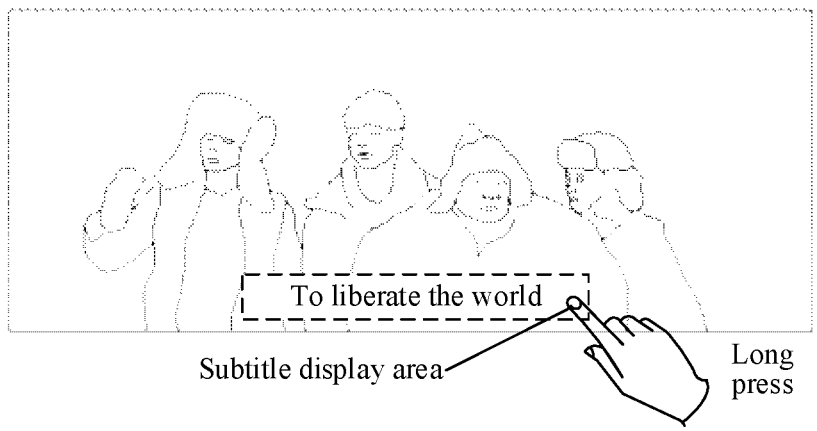
FIG. 3 is a schematic diagram of an optional subtitle area according to an embodiment of this application.
Figure 4:
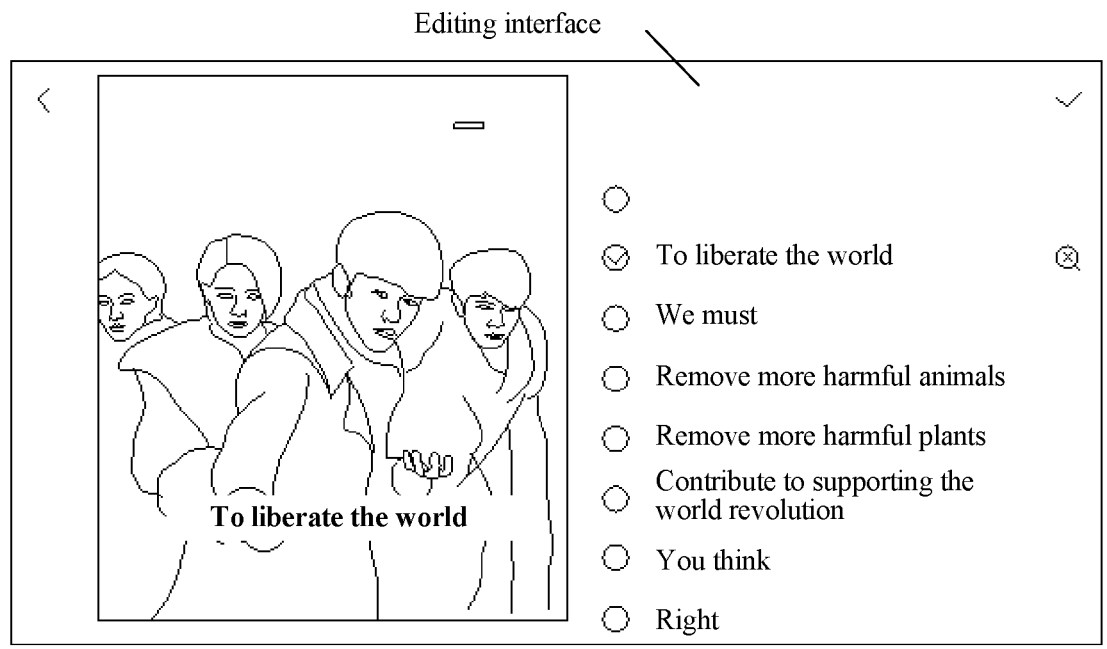
FIG. 4 is a schematic diagram of an optional editing interface according to an embodiment of this application.

As shown in FIG. 3, the user (that is, the target account) may trigger the first instruction by long pressing on a subtitle display area (that is, an entrance interface), clicking an edit button, or entering an edit gesture to enter an editing interface shown in FIG. 4.

In the technical solution provided in step S204, the electronic device displays, in response to the obtained first instruction, a plurality of subtitles on the client, the plurality of subtitles being subtitles of the target video within a target playback time period, and the target playback time period including a first moment to which the target video is played in a case that the first instruction is obtained.

(1) The technical solution of step S204 is described in detail below from a user interaction side:

Optionally, in addition to selecting the subtitles to be shared, the user may further select media information to share with the subtitles. During the displaying of the plurality of subtitles on the client, and in a case that a third instruction of the target account is obtained, to-be-shared first media information is determined according to a plurality of pieces of media information, the third instruction being used for indicating the to-be-shared first media information, and the plurality of pieces of media information being information used for representing content in the target video. In this case, the sharing at least the first subtitle may include: sharing the first media information and the first subtitle.

The foregoing media information includes but is not limited to the following forms: short videos (such as videos with short duration of 10 seconds, 30 seconds, 1 minute, or the like), dynamic pictures (such as pictures in GIF format), and still pictures.

The displaying a plurality of subtitles on the client includes: displaying the plurality of subtitles in a first area of an editing interface of the client, the first area being provided with an operation control for selecting at least one second subtitle in the plurality of subtitles. After the target account makes a selection, that is, the plurality of subtitles are displayed on the client, the at least one second subtitle may be displayed in a second area of the editing interface of the client, the second area being provided with an operation control for performing a first editing operation on the second subtitle, facilitating the editing of the subtitles by the target account.

During or after the displaying of the plurality of subtitles on the client, the plurality of pieces of media information may be displayed in a first area of the editing interface of the client, the first area being provided with an operation control for selecting at least one piece of second media information in the plurality of pieces of media information; and after the target account makes a selection, the at least one piece of second media information is displayed in a second area of the client, the second area being provided with an operation control for performing a second editing operation on the second media information, facilitating the editing of the media information by the target account.

An order of editing the media information and the subtitles is not limited in the embodiments of this application. The media information may be edited first and the subtitles is edited later, or the subtitles may be edited first and the media information is edited later.

(2) The technical solution of step S204 is described in detail below from a technical side:

The method for obtaining "the plurality of subtitles and the plurality of pieces of media information" is as follows.

Before the plurality of subtitles are displayed on the client, the client sends request information to a content server providing the target video, the request information carrying the first moment, and the content server being configured to search for the plurality of pieces of media information of the target video and search for the plurality of subtitles within the target playback time period determined according to the first moment; and the plurality of subtitles and the plurality of pieces of media information returned by the content server are received on the client.

For the determination of the target playback time period, refer to the foregoing description about the configuration of "the first moment" or the subtitles at the first moment.

The method for editing "the subtitles" in the editing interface is as follows.

Figure 5:
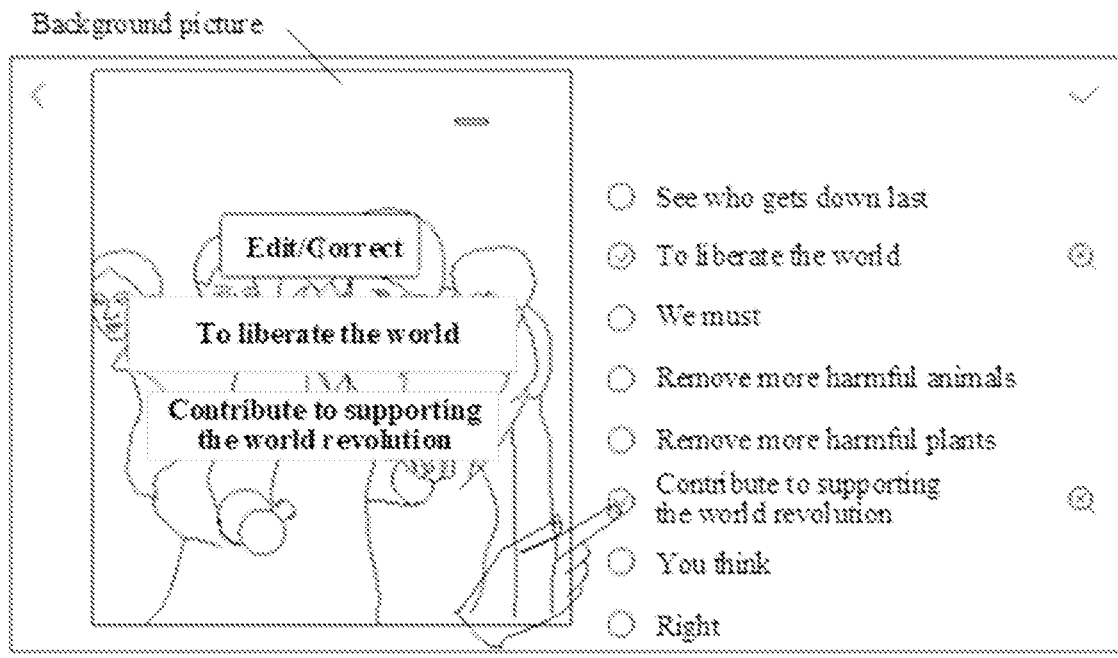
FIG. 5 is a schematic diagram of another optional editing interface according to an embodiment of this application.

Optionally, the determining the to-be-shared first subtitle according to the plurality of subtitles includes: obtaining at least one second subtitle in the plurality of subtitles, where as shown in FIG. 5, the first account may select (by clicking a small circle in front of a field) one or more subtitles (to be displayed in a background picture), and optionally, after the first account enters the editing interface, current lines (that is, currently displayed subtitles) may be selected by default, and the lines may be added, edited, and corrected; and performing, on the obtained second subtitle, a second editing operation indicated by the second instruction, and using the second subtitle on which the second editing operation is performed as the first subtitle.

The foregoing "performing, on the obtained second subtitle, a second editing operation indicated by the second instruction" includes at least one of the following:

1) editing or replacing words, replacing a first word in the second subtitle with a second word indicated by the second instruction, for example, performing correction, that is, replacing the incorrect first word with the correct second word, or for another example, performing literary processing, that is, replacing the relatively plain first word with the more artistic second word;

2) configuring a font of the second subtitle to a font indicated by the second instruction, such as regular script or boldface;

3) configuring a color of the second subtitle to a color indicated by the second instruction, such as red, black, or green;

4) configuring a font size of the second subtitle to a font size indicated by the second instruction, such as "35px", "56px", or "32px";

5) configuring a word spacing of the second subtitle to a word spacing indicated by the second instruction, such as 0.2 cm, 0.5 cm, 1 cm, or 2 cm;

6) configuring a font height of the second subtitle to a font height indicated by the second instruction, such as 0.3 cm, 0.5 cm, 1 cm, or 2 cm; and 7) deleting or adding a subtitle from or to the obtained at least one second subtitle, that is, deleting a whole subtitle, or adding a whole paragraph of text, or the like.

As shown in FIG. 5, for the foregoing editing or error correction and replacement operation on the words, after the incorrect first word is replaced with the correct second word, a correct subtitle and a playback time of the subtitle may be fed back to a content server, and the server replaces a previous incorrect subtitle with the subtitle.

The method for editing "the media information" in the editing interface is as follows.

Figure 6:
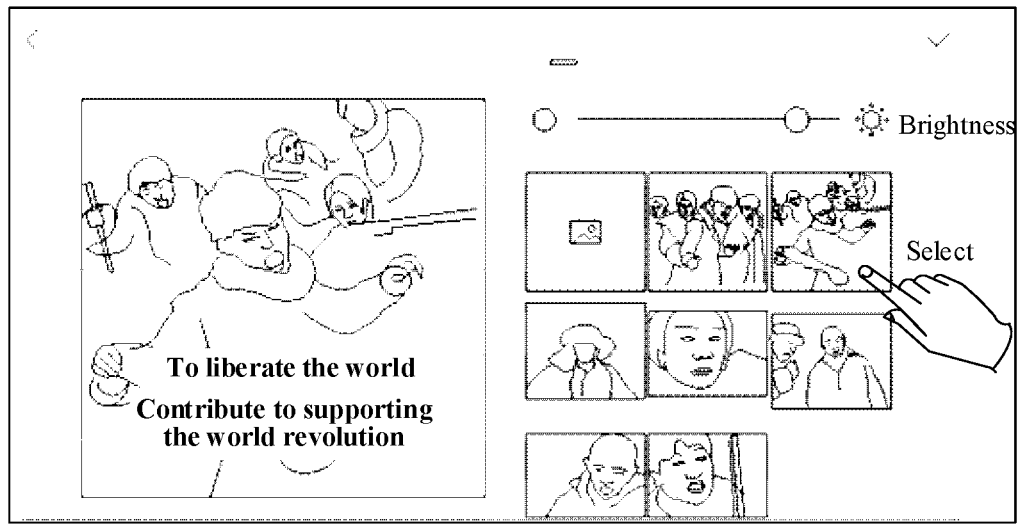
FIG. 6 is a schematic diagram of another optional editing interface according to an embodiment of this application.

In the embodiments of this application, the determining to-be-shared first media information according to a plurality of pieces of media information includes: obtaining at least one of the plurality of pieces of media information as second media information, as shown in FIG. 6, one picture (which may be a still) may be selected as the background, and the still may be replaced; performing, on the second media information, a first editing operation indicated by the third instruction (for example, the still may be rotated, moved, and scaled, or the brightness of the still may be adjusted), and using the second media information on which the first editing operation is performed as the first media information.

In a case that the second media information is used as a background picture of the first subtitle, the performing, on the second media information, a first editing operation indicated by the third instruction includes at least one of the following:

1) moving, in a second area, a position of the picture, that is, moving, in a second area, the second media information to a position indicated by the third instruction;

2) scaling, in the second area, the second media information according to a scaling ratio indicated by the third instruction; and 3) rotating, in the second area, the second media information according to a rotation angle indicated by the third instruction.

In the technical solution provided by step S206, the second instruction is obtained, a to-be-shared first subtitle is determined according to the plurality of subtitles, and at least the first subtitle is shared.

Figure 7:
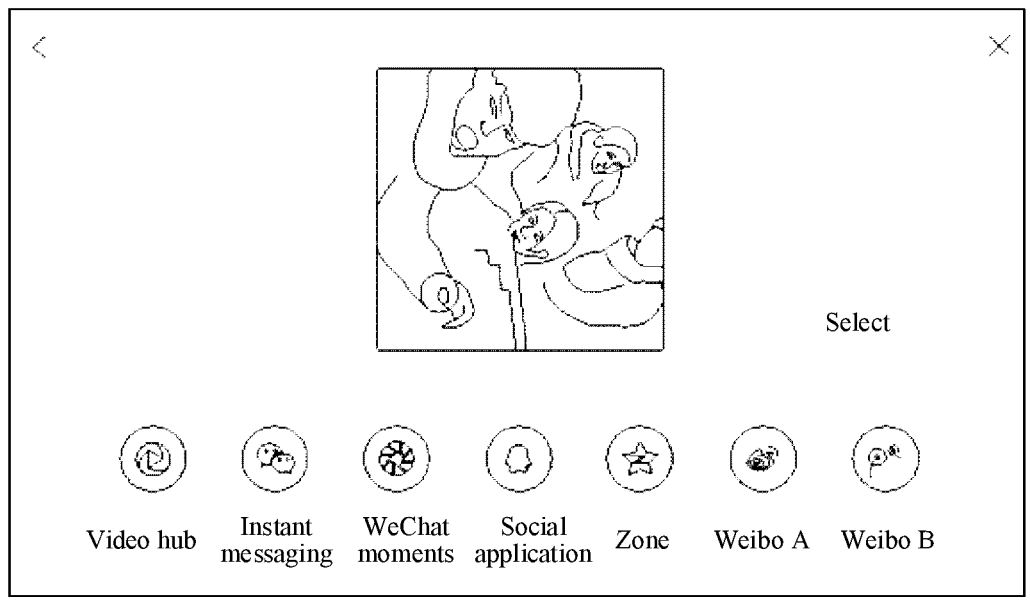
FIG. 7 is a schematic diagram of an optional sharing interface according to an embodiment of this application.

Optionally, the sharing the first media information and the first subtitle includes: as shown in FIG. 7, displaying at least one share control and target information in the sharing channel interface of the client, the target information including the first subtitle and the first media information, and each share control being used for indicating a sharing path; and sharing the target information according to the sharing path indicated by the share control selected by the target account.

According to the technical solution of the embodiments of this application, the following problems may be avoided: 1) When a button is pressed to select a line, an incorrect line may be selected due to a time error. 2) A text is simply shared without combination with stills scenes. 3) There is only one line, and artistic conception may be lost without context. 4) Lines cannot be edited or corrected, stills cannot be selected, and there is no creative space. According to the technical solution of the embodiments of this application, a perfect solution is provided for the foregoing existing problems. Users are provided with functions such as context selection, line editing and correction, and still selection and editing, while line sharing is implemented, thereby greatly improving users' creative space and willingness to share.

Figure 8:
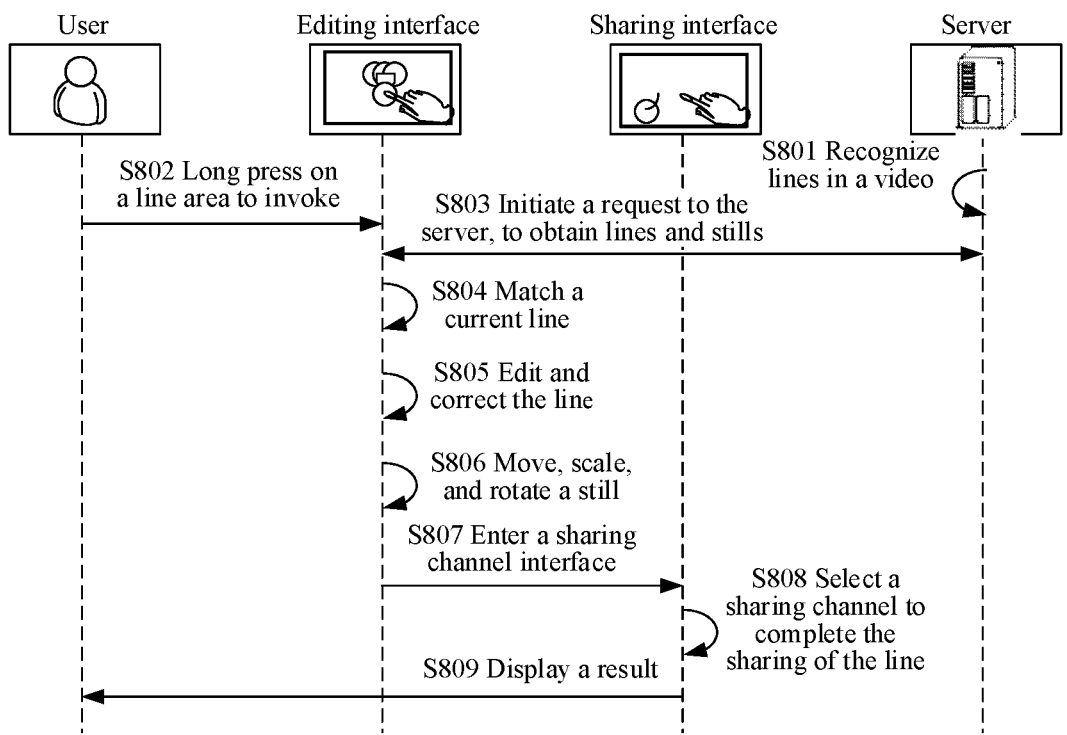
FIG. 8 is a flowchart of another optional information sharing method according to an embodiment of this application.

In an optional embodiment, the following describes the embodiments of this application in detail by using an example in which the media information is a still, as shown in FIG. 8:

Step S801. A server recognizes lines in a video in advance.

Step S802. When watching the video, the user long presses on a line area to invoke a sharing and editing interface.

Step S803. An app initiates a request to the server in the sharing and editing interface, to obtain lines and stills.

Step S804. The app matches a current line according to a current playback time and selects the current line by default.

Step S805. The user may select a plurality of lines (for example, six lines) in total, and manually edit and correct the lines.

A plurality of lines may be selected (for example, one to six lines). A total maximum quantity of rows is a threshold (for example, 12 rows). When 12 rows are not enough for displaying the lines, the last row ends with an ellipsis " . . . ". The same font size is used when the lines are displayed within five rows, and the font size may gradually decrease from the sixth row. In this embodiment of this application, a configuration table is dynamically generated for text editing to meet dynamic changes of the font size. The configuration table is shown in Table 1:

TABLE 1

| Rows | Font size (px) | Spacing (px) | Word count in a row | Row height (px) |
|---|---|---|---|---|
| 5 | 75.72 | 18 | 8 | 98 |
| 6 | 60.6 | 14 | 10 | 79 |
| 7 | 52.8 | 12 | 12 | 69 |
| 8 | 44.7 | 10 | 14 | 59 |

Description of the configuration table: "px" represents pixels, "rows" represents a quantity of rows in which the lines are displayed, "font size" is a font size corresponding to the quantity of rows in which the lines are displayed, "spacing" is a text row spacing in the current font size, "word count in a row" is a quantity of text words that can be displayed in the current font size, and "row height" is a text height in a current font size.

Calculation principle of the configuration table:

(1) a height h and a width w of a display area are dynamically obtained according to a screen of a mobile phone;

(2) displayed rows (5 to 12 rows) are traversed, and a maximum height h1 of a row is calculated during each traversal, where h1=h/rows;

(3) according to h1, an initial font size and a text spacing are obtained, where size=(4/5)*h1, and spacing=(1/5)*h1;

(4) a true height of a text is calculated according to size and spacing, and because there will be a blank area around the text when the text is displayed, height>h1;

(5) size is traversed, and 1 dp (device independent pixels) is decrement in a single step, so that height<h1, and the final size, spacing, and height are obtained if the condition is met;

(6) a system pen interface is used to obtain a single text width w1 according to size, and text word count=w/w1; and (7) the foregoing 2 to 6 are repeated to obtain font size, spacing, text count, and text height in all rows, that is, the configuration table shown in Table 1.

Step S806. The user may select a still as the background, and the still may be moved, scaled, and rotated.

Displacement, rotation, and scaling of a picture are implemented by using a system matrix. After a rotation gesture is released, coordinates of four vertices of a picture after rotation are calculated according to matrix values and initial coordinates of the four vertices of the picture, and then a tilt angle is calculated. Finally, the angle is adjusted to 0 or 90 or 180 or 270 degrees (or may be distinguished according to finer granularities, such as in 10-degree intervals).

If the rotation angle of the rotation gesture is less than or equal to 90 degrees, the angle is adjusted to 90 degrees. If the rotation angle of the rotation gesture is greater than 90 degrees and less than or equal to 180 degrees, the angle is adjusted to 180 degrees. If the rotation angle of the rotation gesture is greater than 180 degrees and less than or equal to 270 degrees, the angle is adjusted to 270 degrees. Other gestures may also be defined according to requirements, for example, the rotation angle may be determined according to a distance by which a picture is moved left and right.

The matrix used for representing the initial coordinates of the vertices of the picture (W is a picture width and H is a picture height) is as follows:

$$\begin{bmatrix} 0 \\ 0 \\ 1 \end{bmatrix}; \begin{bmatrix} W \\ 0 \\ 1 \end{bmatrix}; \begin{bmatrix} 0 \\ H \\ 1 \end{bmatrix}; \begin{bmatrix} W \\ H \\ 1 \end{bmatrix};$$

The displacement, scaling, and rotation of the picture are implemented through the matrix. To be specific, the initial coordinates of the four vertices of the picture are used to perform matrix calculations to obtain new coordinates. For the initial coordinates of the vertices of the picture, W is an x-axis direction, that is, a width, H is a y-axis direction, that is, a height, and a Z-axis in a planar graph is 1.

The system matrix is as follows:

$$\begin{bmatrix} MSCALE\_X & MSKEW\_X & MTRNS\_X \\ MSKEW\_Y & MSCALE\_Y & MTRANS\_Y \\ MPERSP\_0 & MPERSP\_1 & MPERSP\_2 \end{bmatrix};$$

MSCALE_X, MSKEW_X, MTRNS_X, MSKEW_Y, MSCALE_Y, MTRANS_Y, MPERSP_0, MPERSP_1, and MPERSP_2 are transformation coefficients. MSCALE is used for dealing with scaling transformations, MSKEW is used for dealing with skew transformations (for example, MSCALE_X is used for dealing with x-axis skew transformations), MTRANS is used for dealing with translation transformations (for example, MTRANS_Y is used for dealing with y-axis translation transformations), and MPERSP is used for dealing with perspective transformations.

The coordinates of the four vertices of the picture after transformation are the product of the foregoing initial coordinates and the system matrix.

Initially, it is an identity matrix:

$$\begin{bmatrix} 1 & 0 & 0 \\ 0 & 1 & 0 \\ 0 & 0 & 1 \end{bmatrix}.$$

For displacement, after the x-axis and the y-axis are simultaneously displaced by 10 unit distances, the matrix is:

$$\begin{bmatrix} 1 & 0 & 10 \\ 0 & 1 & 10 \\ 0 & 0 & 1 \end{bmatrix}.$$

For rotation, after the unit is rotated by a degrees from the origin, the matrix is:

$$\begin{bmatrix} \sin\alpha & -\cos\alpha & 0 \\ \sin\alpha & \sin\alpha & 0 \\ 0 & 0 & 1 \end{bmatrix}.$$

If f[0] and f[1] to f[8] are used to represent nine values in the matrix (in the order from left to right and from top to bottom), and the matrix is rotated by 45 degrees from the origin, f[1]=0.70710677, and the rest of the values may be obtained by analogy. The coordinates of the four vertices after displacement and rotation may be obtained through calculation according to the matrix calculation formula:

float $x1=f[0]*0+f[1]*0+f[2]$;

float $y1=f[3]*0+f[4]*0+f[5]$;

float $x2=f[0]*W+f[1]*0+f[2]$;

float $y2=f[3]*W+f[4]*0+f[5]$;

float $x3=f[0]*0+f[1]*H+f[2]$;

float $y3=f[3]*0+f[4]*H+f[5]$;

float $x4=f[0]*W+f[1]*H+f[2]$; and float $y4=f[3]*W+f[4]*H+f[5]$;

where float means taking a floating point number, coordinates of the first vertex are (x1, y1), coordinates of the second vertex are (x2, y2), coordinates of the third vertex are (x3, y3), and coordinates of the fourth vertex are (x4, y4).

Step S807. After the user finishes editing the lines and the stills, transition animation is executed to gently enter a sharing channel interface.

Transition Animation:

transition animation is mainly used for allowing the user to gently transition from the editing interface to the sharing interface.

Figure 9:
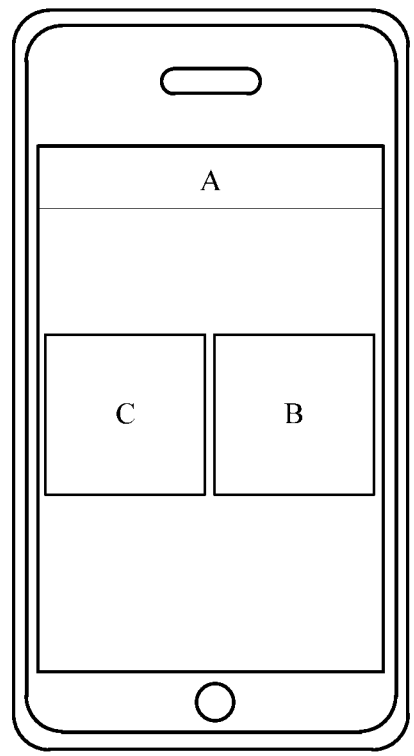
FIG. 9 is a schematic diagram of another optional editing interface according to an embodiment of this application.

The editing interface is divided into three modules, as shown in FIG. 9, including an area A for displaying an interface title, a selection area B (a first area), and an editing area C (a second area).

Figure 10:
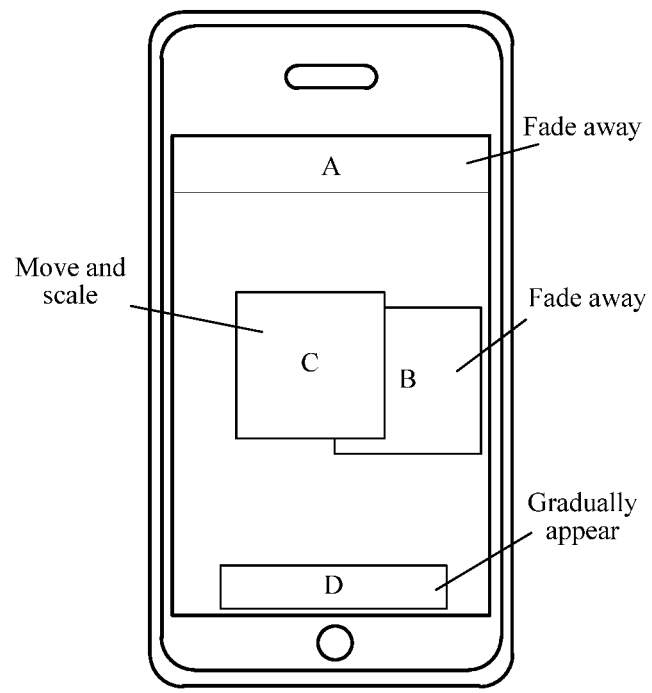
FIG. 10 is a schematic diagram of another optional editing interface according to an embodiment of this application.

When the animation is executed, as shown in FIG. 10, the title module area A fades away, the editing area module C is moved to the middle and scaled to a certain proportion, the selection area B fades away, and a sharing channel module D gradually appears.

Step S808. The user selects a sharing channel to complete the sharing of the line.

Figure 11:
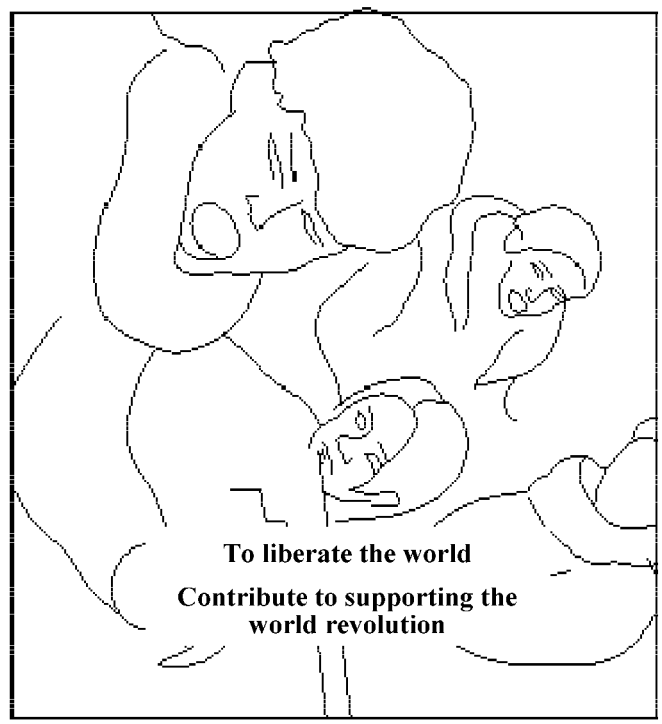
FIG. 11 is a schematic diagram of optional sharing content according to an embodiment of this application.

Step S809. Display a result, for example, content to be shared (as shown in FIG. 11), or whether a sharing operation succeeds.

According to the information sharing solution in the embodiments of this application, lines can be shared, and beneficial effects in at least the following aspects are provided: facilitating the sharing of lines in combination with scenes by users; providing creative space to improve users' willingness to share; and increasing the amount of sharing and video playback.

The foregoing method embodiments are expressed as a series of action combinations for the purpose of brief description, but a person skilled in the art is to know that because some steps may be performed in other sequences or simultaneously according to the embodiments of this application, the embodiments of this application are not limited to a described action sequence. It is to be further appreciated by a person skilled in the art that the embodiments described in this specification all belong to preferred embodiments, and the actions and modules in the embodiments are not necessarily required by the embodiments of this application.

Through the foregoing description of the implementations, it is clear to a person skilled in the art that this disclosure may be implemented by software plus a necessary universal hardware platform, and certainly may also be implemented by hardware, but in many cases, the software implementation is exemplary. Based on such an understanding, the technical solutions of the embodiments of this application essentially or the part contributing to the related art may be implemented in a form of a software product. The computer software product is stored in a storage medium (such as a read-only memory (ROM)/random access memory (RAM), a magnetic disk, or an optical disc) and includes several instructions for instructing a terminal device (which may be a mobile phone, a computer, a server, a network device, a TV remote control or the like) to perform the methods described in the embodiments of this application.

Figure 12:
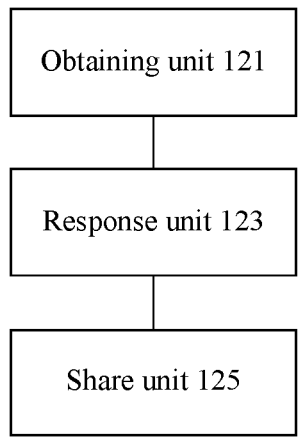
FIG. 12 is a schematic diagram of an optional information sharing apparatus according to an embodiment of this application.

According to another aspect of the embodiments of this application, an information sharing apparatus for performing the foregoing information sharing method is further provided. FIG. 12 is a schematic diagram of an optional information sharing apparatus according to an embodiment of this application. The apparatus may include one or more processors, and one or more memories storing program units, the program units being executed by the processors. As shown in FIG. 12, the program units include an obtaining unit 121, a response unit 123, and a share unit 125.

The obtaining unit 121 is configured to obtain a first instruction of a target account, the target account being an account used on a client, and the first instruction being used for instructing to obtain a subtitle in a target video currently played on the client.

The foregoing client may be installed on the terminal 104 shown in FIG. 1. The foregoing client is a client for playing a video, and may be specifically a client of a video application, a web client, or a video client on a smart device such as a smart TV. The foregoing target account is an account that is allowed to be used on the client, for example, an account of the video application, an account (such as a social networking platform account or an instant messaging account) of another application, or a mobile phone number.

In a case that the target video is played on the client, the target account may trigger the first instruction through a trigger control provided by the client, for example, by long pressing on a subtitle display area, through a button on the client, or through a built-in gesture of the client or a gesture agreed upon by the client.

The foregoing subtitle (subtitle of motion picture) refers to non-image content such as dialogs in TV series, movies, and stage productions (that is, the target video) in text form, for example, narrative texts and various texts appearing in a lower part of a movie screen or TV screen, including lyrics, dialogs, and explanatory words having text information such as character introductions, place names and dates. The technical solution of the embodiments of this application is particularly applicable to dialog subtitles (also referred to as lines) of film and television works.

The response unit 123 is configured to display, in response to the obtained first instruction, a plurality of subtitles on the client, the plurality of subtitles being subtitles of the target video within a target playback time period, and the target playback time period including a first moment to which the target video is played in a case that the first instruction is obtained.

In a case that the first instruction is obtained, the target account enters an editing interface, the plurality of subtitles are displayed on the editing interface, and the target account can edit the subtitles and other content through an editing control of the editing interface. Different editing controls may correspond to different instructions, for example, the second instruction is used for instructing to determine a first subtitle.

The foregoing target playback time period may be a fixed time period (such as 1 second, 3 seconds, 5 seconds, or 10 seconds), and a position of the first moment in the time period may be determined according to configuration information, for example, may be a start position, an end position, or a middle position in the time period.

The foregoing target playback time period may be a time period with a fixed quantity of subtitles (such as 3, 5, or 10 subtitles), and a position of a subtitle displayed at the first moment in the plurality of subtitles may be determined according to configuration information, for example, may be a start position, an end position, or a middle position in the plurality of subtitles.

The share unit 125 is configured to obtain a second instruction, determine a to-be-shared first subtitle according to the plurality of subtitles, and share at least the first subtitle, the second instruction being used for instructing to determine the to-be-shared first subtitle according to the plurality of subtitles.

The foregoing first subtitle is determined after processing of the plurality of subtitles, and the processing includes selection, editing, and the like. Through configuring the target time period, the target account can obtain subtitles within a time period. Even if subtitles have changed (a subtitle that a first account is interested in has been skipped) when the target account triggers the first instruction, the plurality of subtitles that are finally displayed still include the subtitle that has flashed and that the first account is interested in, thereby avoiding the problem that a client cannot accurately obtain a target subtitle.

The obtaining unit 121 in this embodiment may be configured to perform step S202 in the embodiments of this application, the response unit 123 in this embodiment may be configured to perform step S204 in the embodiments of this application, and the share unit 125 in this embodiment may be configured to perform step S206 in the embodiments of this application.

Implemented examples and application scenarios of the foregoing modules are the same as those of the corresponding steps, but are not limited to the content disclosed by the foregoing embodiment. The foregoing modules may run, as a part of the apparatus, in the hardware environment as shown in FIG. 1, and may be implemented by using software, or may be implemented by using hardware.

Through the foregoing modules, after a first instruction of a target account is obtained, a plurality of subtitles are displayed on a client, the plurality of subtitles being subtitles of a target video within a target playback time period, and the target playback time period including a first moment to which the target video is played in a case that the first instruction is obtained; and a second instruction is obtained, a to-be-shared first subtitle is determined according to the plurality of subtitles, and the first subtitle (that is, a target subtitle) is at least shared, to resolve the technical problem in the related art that a target subtitle cannot be accurately obtained, thereby achieving the technical effect of accurately obtaining a target subtitle.

An embodiment of this application provides a solution for real-time sharing of video lines, and the foregoing technical solution of the embodiments of this application may be integrated on a client. The client may include three interfaces: an entrance interface, an editing interface, and a sharing channel interface. When watching a video and having a willingness to share lines that appear, the user may long press on a line display area to display the entrance interface and enter the editing interface. At the same time, the lines upon entry are selected by default, and the editing interface provides a list of lines, stills, and the like (that is, media information) for the user to edit independently. The lines may be edited, and a plurality of sentences (that is, a plurality of subtitles, such as six subtitles) may be corrected. Each line may be displayed in a plurality of rows according to a quantity of words, and all lines may be finally displayed in a plurality of rows (such as 12 rows). A program dynamically adjusts a font size according to a quantity of rows in which the lines are displayed (a larger quantity of rows indicates a smaller font size). The still may be rotated, moved, and scaled. The program finally rotate the still at 0 or 90 or 180 or 270 degrees according to an angle at which it is rotated by the user. The editing interface can improve the user's creative space. After finishing editing, the user clicks "finish" to execute transition animation to gently enter the sharing channel interface. After the user selects a channel, the sharing is completed.

According to the technical solution of the embodiments of this application, when the user watches a video and wants to share classic, meaningful or touching lines appearing in the video, the user can share the lines in combination with video scenes, without needing to memorize the lines and edit them manually, which greatly improves the user's willingness to share.

The foregoing response unit is further configured to determine to-be-shared first media information according to a plurality of pieces of media information during the displaying of the plurality of subtitles on the client, and in a case that a third instruction of the target account is obtained, the third instruction being used for indicating the to-be-shared first media information, and the plurality of pieces of media information being information used for representing content in the target video. The share unit is further configured to share the first media information and the first subtitle.

Optionally, the response unit includes: a first display module, configured to display the plurality of subtitles in a first area of the client, the first area being provided with an operation control for selecting at least one second subtitle in the plurality of subtitles; and a second display module, configured to display the at least one second subtitle in a second area of the client after the displaying of the plurality of subtitles on the client, the second area being provided with an operation control for performing a first editing operation on the second subtitle.

Optionally, the response unit includes: a third display module, configured to display the plurality of pieces of media information in a first area of the client during or after the displaying of the plurality of subtitles on the client, the first area being provided with an operation control for selecting at least one piece of second media information in the plurality of pieces of media information; and a fourth display module, configured to display the at least one piece of second media information in a second area of the client, the second area being provided with an operation control for performing a second editing operation on the second media information.

The foregoing share unit includes: a fifth display module, configured to display at least one share control and target information on the client, the target information including the first subtitle and the first media information, and each share control being used for indicating a sharing path; and a sharing module, configured to share the target information according to the sharing path indicated by the share control selected by the target account.

During the determining of the to-be-shared first media information according to a plurality of pieces of media information, the foregoing response unit obtains at least one of the plurality of pieces of media information as second media information; and performs, on the second media information, a first editing operation indicated by the third instruction, and uses the second media information on which the first editing operation is performed as the first media information.

In a case that the second media information is used as a background picture of the first subtitle, that the response unit performs, on the second media information, a first editing operation indicated by the third instruction includes at least one of the following:

moving, in a second area, the second media information to a position indicated by the third instruction;

scaling, in the second area, the second media information according to a scaling ratio indicated by the third instruction; and rotating, in the second area, the second media information according to a rotation angle indicated by the third instruction.

During the determining of the to-be-shared first subtitle according to the plurality of subtitles, the foregoing response unit obtains at least one second subtitle in the plurality of subtitles; and performs, on the obtained second subtitle, a second editing operation indicated by the second instruction, and uses the second subtitle on which the second editing operation is performed as the first subtitle.

Optionally, that the response unit performs, on the obtained second subtitle, a second editing operation indicated by the second instruction includes at least one of the following:

replacing a first word in the second subtitle with a second word indicated by the second instruction;

configuring a font of the second subtitle to a font indicated by the second instruction;

configuring a color of the second subtitle to a color indicated by the second instruction;

configuring a font size of the second subtitle to a font size indicated by the second instruction;

configuring a word spacing of the second subtitle to a word spacing indicated by the second instruction;

configuring a font height of the second subtitle to a font height indicated by the second instruction; and deleting or adding a subtitle from or to the obtained at least one second subtitle.

Optionally, the apparatus in the embodiments of this application may further include: a sending unit, configured to send, before the plurality of subtitles are displayed on the client, request information to a content server providing the target video, the request information carrying the first moment, and the content server being configured to search for the plurality of pieces of media information of the target video and search for the plurality of subtitles within the target playback time period determined according to the first moment; and a receiving unit, configured to receive the plurality of subtitles and the plurality of pieces of media information returned by the content server on the client.

According to the information sharing solution in the embodiments of this application, lines can be shared, and beneficial effects in at least the following aspects are provided: facilitating the sharing of lines in combination with scenes by users; providing creative space to improve users' willingness to share; and increasing the amount of sharing and video playback.

Implemented examples and application scenarios of the foregoing modules are the same as those of the corresponding steps, but are not limited to the content disclosed by the foregoing embodiment. The foregoing modules may run, as a part of the apparatus, in the hardware environment shown in FIG. 1, and may be implemented by using software, or may be implement by using hardware. The hardware environment includes a network environment.

According to another aspect of the embodiments of this application, an electronic device configured to perform the information sharing method is further provided. The electronic device may be a server or a terminal.

Figure 13:
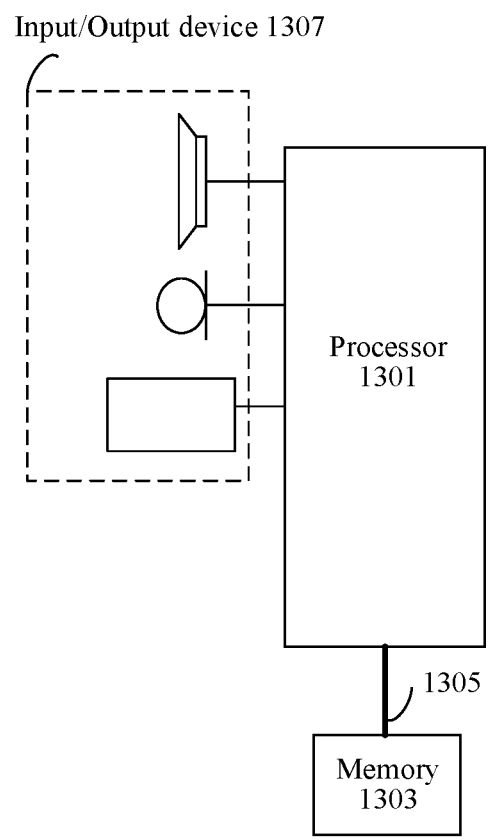
FIG. 13 is a structural block diagram of an electronic device according to an embodiment of this application.

FIG. 13 is a structural block diagram of an electronic device according to an embodiment of this application. The following description is provided by using an example in which the electronic device is a terminal. As shown in FIG. 13, the terminal may include: one or more processors 1301

(only one is shown in FIG. 13), a memory 1303, and a transmission apparatus 1305 (such as the sending apparatus in the foregoing embodiments). As shown in FIG. 13, the terminal may further include an input/output device 1307.

The memory 1303 may be configured to store a software program and a module, for example, a program instruction/module corresponding to the information sharing method and apparatus in the embodiments of this application, and the processor 1301 runs a software program and a module stored in the memory 1303 to perform various functional applications and data processing, that is, implement the foregoing information sharing method. The memory 1303 may include a high speed random access memory, and may further include a non-volatile memory, for example, one or more magnetic storage apparatuses, a flash memory, or another non-volatile solid-state memory. In some examples, the memory 1303 may further include a memory disposed remote to the processor 1301, and the remote memory may be connected to the terminal through a network. Examples of the network include but are not limited to, the Internet, an intranet, a local area network, a mobile communications network, and a combination thereof.

The transmission apparatus 1305 is configured to receive or send data through a network, and may be further configured to transmit data between a processor and a memory. Specific examples of the foregoing network include a wired network and a wireless network. In an example, the transmission apparatus 1305 includes a network interface controller (NIC), which may be connected to another network device and a router through a cable, so as to communicate with the Internet or a local area network. In an example, the transmission apparatus 1305 is a radio frequency (RF) module, which is configured to communicate with the Internet in a wireless manner.

Specifically, the memory 1303 is configured to store an application program.

The processor 1301 may invoke, by using the transmission apparatus 1305, the application program stored in the memory 1303, to perform the following steps:

obtaining a first instruction of a target account, the target account being an account used on a client, and the first instruction being used for instructing to obtain a subtitle in a target video currently played on the client;

displaying, in response to the obtained first instruction, a plurality of subtitles on the client, the plurality of subtitles being subtitles of the target video within a target playback time period, and the target playback time period including a first moment to which the target video is played in a case that the first instruction is obtained; and obtaining a second instruction, determining a to-be-shared first subtitle according to the plurality of subtitles, and sharing at least the first subtitle, the second instruction being used for instructing to determine the to-be-shared first subtitle according to the plurality of subtitles.

The processor 1301 is further configured to perform at least one of the following steps:

replacing a first word in the second subtitle with a second word indicated by the second instruction;

configuring a font of the second subtitle to a font indicated by the second instruction;

configuring a color of the second subtitle to a color indicated by the second instruction;

configuring a font size of the second subtitle to a font size indicated by the second instruction;

configuring a word spacing of the second subtitle to a word spacing indicated by the second instruction;

configuring a font height of the second subtitle to a font height indicated by the second instruction; and deleting or adding a subtitle from or to the obtained at least one second subtitle.

According to the embodiments of this application, after a first instruction of a target account is obtained, a plurality of subtitles are displayed on a client, the plurality of subtitles being subtitles of a target video within a target playback time period, and the target playback time period including a first moment to which the target video is played in a case that the first instruction is obtained, and a second instruction is used for indicating a to-be-shared first subtitle; and the second instruction is obtained, the to-be-shared first subtitle is determined according to the plurality of subtitles, and at least the first subtitle (that is, a target subtitle) is shared, to resolve the technical problem in the related art that a target subtitle cannot be accurately obtained, thereby achieving the technical effect of accurately obtaining a target subtitle.

Optionally, for a specific example in this embodiment, refer to the examples described in the foregoing embodiments, and details are not described herein again in this embodiment.

A person of ordinary skill in the art may understand that the structure shown in FIG. 13 is merely an example, and the terminal may be a terminal device such as a smartphone (for example, an Android mobile phone or an iOS mobile phone), a tablet computer, a palmtop computer, a MID, a TV remote control and a PAD. FIG. 13 does not constitute a limitation on a structure of the foregoing electronic device. For example, the terminal may further include more or fewer components (such as a network interface and a display apparatus) than those shown in FIG. 13, or may have a configuration different from that shown in FIG. 13.

A person of ordinary skill in the art may understand that all or some of the steps of the methods in the embodiments may be implemented by a program by instructing hardware relevant to a terminal device. The program may be stored in a computer readable storage medium. The storage medium may be a flash drive, a ROM, a RAM, a magnetic disk, an optical disc, and so on.

An embodiment of this application further provides a storage medium. Optionally, in this embodiment, the storage medium may be configured to execute program code of the information sharing method.

Optionally, in this embodiment, the storage medium may be located on at least one of a plurality of network devices on the network shown in the foregoing embodiment.

Optionally, in this embodiment, the storage medium is configured to store the program code used for performing the following steps:

S21. Obtain a first instruction of a target account, the target account being an account used on a client, and the first instruction being used for instructing to obtain a subtitle in a target video currently played on the client.

S22. Display, in response to the obtained first instruction, a plurality of subtitles on the client, the plurality of subtitles being subtitles of the target video within a target playback time period, and the target playback time period including a first moment to which the target video is played in a case that the first instruction is obtained.

S23. Obtain a second instruction, determine a to-be-shared first subtitle according to the plurality of subtitles, and share at least the first subtitle, the second instruction being used for instructing to determine the to-be-shared first subtitle according to the plurality of subtitles.

Optionally, the storage medium is further configured to store program code used for performing the following steps:

S31. Replace a first word in the second subtitle with a second word indicated by the second instruction.

S32. Configure a font of the second subtitle to a font indicated by the second instruction.

S33. Configure a color of the second subtitle to a color indicated by the second instruction.

S34. Configure a font size of the second subtitle to a font size indicated by the second instruction.

S35. Configure a word spacing of the second subtitle to a word spacing indicated by the second instruction.

S36. Configure a font height of the second subtitle to a font height indicated by the second instruction.

S37. Delete or add a subtitle from or to the obtained at least one second subtitle.

Optionally, for a specific example in this embodiment, refer to the examples described in the foregoing embodiments, and details are not described herein again in this embodiment.

Optionally, in this embodiment, the foregoing storage medium may include but is not limited to: any medium that can store program code, such as a USB flash drive, a ROM, a RAM, a removable hard disk, a magnetic disk, or an optical disc.

The sequence numbers of the foregoing embodiments of this application are merely for description purpose but do not indicate the preference of the embodiments.

When the integrated unit in the foregoing embodiments is implemented in the form of a software functional unit and sold or used as an independent product, the integrated unit may be stored in the foregoing computer-readable storage medium. Based on such understanding, the technical solutions of this application essentially, or some contributing to the related art, or all or some of the technical solutions may be implemented in a form of a software product. The computer software product is stored in a storage medium and includes several instructions for instructing one or more computer devices (which may be a personal computer, a server, a network device, or the like) to perform all or some of steps of the methods in the embodiments of this application.

In the foregoing embodiments of this application, the description of each embodiment has respective focuses. For a part that is not described in detail in an embodiment, refer to related descriptions in other embodiments.

In the several embodiments provided in the embodiments of this application, it is to be understood that the disclosed client may be implemented in another manner. The described apparatus embodiment is merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electrical, mechanical, or other forms.

The units described as separate parts may or may not be physically separate, and the parts displayed as units may or may not be physical units, may be located in one position, or may be distributed on multiple network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software function unit.

The foregoing descriptions are merely preferred implementations of the embodiments of this application. A person of ordinary skill in the art may make improvements and polishing without departing from the principle of the embodiments of this application, and these all fall within the protection scope of the embodiments of this application.

INDUSTRIAL APPLICABILITY

After a first instruction of a target account is obtained, a plurality of subtitles are displayed on a client, the plurality of subtitles being subtitles of a target video within a target playback time period, and the target playback time period including a first moment to which the target video is played in a case that the first instruction is obtained; and a second instruction is obtained, a to-be-shared first subtitle is determined according to the plurality of subtitles, and the first subtitle (that is, a target subtitle) is at least shared, to resolve the technical problem in the related art that a target subtitle cannot be accurately obtained, thereby achieving the technical effect of accurately obtaining a target subtitle.

What is claimed is:

1. An information sharing method, performed by an electronic device, the method comprising:
    playing a target video using a client application on the electronic device, the target video including a subtitle display area;
    obtaining a first instruction of a target account of a social networking platform for information capturing at a first moment, the target account being an account used on the client application associated with the electronic device, the first instruction being triggered at the first moment by a user input on a current subtitle in the subtitle display area and used for obtaining a subtitle in the target video currently played on the client;
    in response to the obtained first instruction, replacing the playing of the target video with displaying a still of the target video overlaid with the current subtitle and a plurality of subtitles next to the still of the target video on the client application, the being subtitles of the target video within a target playback time period and including the current subtitle, and the target playback time period covering the first moment at which the first instruction is obtained; and
    obtaining a second instruction of the target account for information sharing;
    in response to the obtained second instruction:
        determining a to-be-shared first subtitle among the plurality of subtitles; and
        sharing at least the still of the target video overlaid with the current subtitle and the first subtitle with at least another account of the social networking platform.

2. The method according to claim 1, further comprising:
    while displaying the plurality of subtitles on the client:
    obtaining a third instruction of the target account, the third instruction being used for indicating to-be-shared first media information; and
    in response to the obtained third instruction, determining the to-be-shared first media information among a plurality of pieces of media information, and the plurality of pieces of media information being information used for representing content in the target video.

3. The method according to claim 2, wherein the sharing at least the first subtitle with the at least another account of the social networking platform comprises: sharing the first media information and the first subtitle with the at least another account of the social networking platform.

4. The method according to claim 1, wherein
the displaying the plurality of subtitles on the client comprises: displaying the plurality of subtitles in a first area of the client, the first area being provided with an operation control for selecting at least one second subtitle in the plurality of subtitles.

5. The method according to claim 4, further comprising:
after displaying the plurality of subtitles on the client:
displaying the at least one second subtitle in a second area of the client, the second area being provided with an operation control for performing a first editing operation on the second subtitle.

6. The method according to claim 1, further comprising:
while displaying the plurality of subtitles on the client:
displaying the plurality of pieces of media information in a first area of the client, the first area being provided with an operation control for selecting at least one piece of second media information in the plurality of pieces of media information; and
displaying the at least one piece of second media information in a second area of the client, the second area being provided with an operation control for performing a second editing operation on the second media information.

7. The method according to claim 3, wherein the sharing the first media information and the first subtitle comprises:
displaying at least one share control and target information on the client, the target information comprising the first subtitle and the first media information, and each share control being used for indicating a sharing path; and
sharing the target information with the at least another account of the social networking platform according to the sharing path indicated by the share control selected by the target account.

8. The method according to claim 2, wherein the determining to-be-shared first media information according to a plurality of pieces of media information comprises:
obtaining at least one of the plurality of pieces of media information as second media information; and
performing, on the second media information, a first editing operation indicated by the third instruction, and using the second media information on which the first editing operation is performed as the first media information.

9. The method according to claim 8, wherein the second media information is used as a background picture of the first subtitle, the performing, on the second media information, a first editing operation indicated by the third instruction comprises at least one of the following:
moving, in a second area, the second media information to a position indicated by the third instruction;
scaling, in the second area, the second media information according to a scaling ratio indicated by the third instruction; and
rotating, in the second area, the second media information according to a rotation angle indicated by the third instruction.

10. The method according to claim 1, wherein the determining a to-be-shared first subtitle according to the plurality of subtitles comprises:
obtaining at least one second subtitle in the plurality of subtitles; and
performing, on the obtained second subtitle, a second editing operation indicated by the second instruction, and using the second subtitle on which the second editing operation is performed as the first subtitle.

11. The method according to claim 10, wherein the performing, on the obtained second subtitle, a second editing operation indicated by the second instruction comprises at least one of the following:
replacing a first word in the second subtitle with a second word indicated by the second instruction;
configuring a font of the second subtitle to a font indicated by the second instruction;
configuring a color of the second subtitle to a color indicated by the second instruction;
configuring a font size of the second subtitle to a font size indicated by the second instruction;
configuring a word spacing of the second subtitle to a word spacing indicated by the second instruction;
configuring a font height of the second subtitle to a font height indicated by the second instruction; and
deleting or adding a subtitle from or to the obtained at least one second subtitle.

12. The method according to claim 1, further comprising:
before displaying the plurality of subtitles on the client:
transmitting request information to a content server providing the target video, the request information carrying the first moment, and the content server being configured to search for the plurality of pieces of media information of the target video and search for the plurality of subtitles within the target playback time period determined according to the first moment; and
receiving, on the client, the plurality of subtitles and the plurality of pieces of media information returned by the content server.

13. An electronic device, comprising one or more processors and one or more memories storing program units that, when executed by the one or more processors, cause the electronic device to perform a plurality of operations including:
playing a target video using a client application on the electronic device, the target video including a subtitle display area;
obtaining a first instruction of a target account of a social networking platform for information capturing at a first moment, the target account being an account used on the client application associated with the electronic device, the first instruction being triggered at the first moment by a user input on a current subtitle in the subtitle display area and used for obtaining a subtitle in the target video currently played on the client;
in response to the obtained first instruction, replacing the playing of the target video with displaying a still of the target video overlaid with the current subtitle and a plurality of subtitles next to the still of the target video on the client application, the plurality of subtitles being subtitles of the target video within a target playback time period and including the current subtitle, and the target playback time period covering the first moment at which the first instruction is obtained; and
obtaining a second instruction of the target account for information sharing;
in response to the obtained second instruction:
determining a to-be-shared first subtitle among the plurality of subtitles; and sharing at least the still of the target video overlaid with the current subtitle and the first subtitle with at least another account of the social networking platform.

14. The electronic device according to claim 13, wherein the plurality of operations further comprise:
while displaying the plurality of subtitles on the client:
obtaining a third instruction of the target account, the third instruction being used for indicating to-be-shared first media information; and
in response to the obtained third instruction, determining the to-be-shared first media information among a plurality of pieces of media information, and the plurality of pieces of media information being information used for representing content in the target video.

15. The electronic device according to claim 14, wherein the sharing at least the first subtitle with the at least another account of the social networking platform comprises: sharing the first media information and the first subtitle with the at least another account of the social networking platform.

16. The electronic device according to claim 13, wherein the displaying the plurality of subtitles on the client comprises: displaying the plurality of subtitles in a first area of the client, the first area being provided with an operation control for selecting at least one second subtitle in the plurality of subtitles.

17. The electronic device according to claim 13, wherein the plurality of operations further comprise:
while displaying the plurality of subtitles on the client:
displaying the plurality of pieces of media information in a first area of the client, the first area being provided with an operation control for selecting at least one piece of second media information in the plurality of pieces of media information; and
displaying the at least one piece of second media information in a second area of the client, the second area being provided with an operation control for performing a second editing operation on the second media information.

18. The electronic device according to claim 13, wherein the determining a to-be-shared first subtitle according to the plurality of subtitles comprises:
obtaining at least one second subtitle in the plurality of subtitles; and
performing, on the obtained second subtitle, a second editing operation indicated by the second instruction, and using the second subtitle on which the second editing operation is performed as the first subtitle.

19. A non-transitory computer readable storage medium, storing a plurality of program units that, when executed by an electronic device having one or more processors, cause the electronic device to perform a plurality of operations including:
playing a target video using a client application on the electronic device, the target video including a subtitle display area;
obtaining a first instruction of a target account of a social networking platform for information capturing at a first moment, the target account being an account used on the client application associated with the electronic device, the first instruction being triggered at the first moment by a user input on a current subtitle in the subtitle display area and used for obtaining a subtitle in the target video currently played on the client;
in response to the obtained first instruction, replacing the playing of the target video with displaying a still of the target video overlaid with the current subtitle and a plurality of subtitles next to the still of the target video on the client application, the plurality of subtitles being subtitles of the target video within a target playback time period and including the current subtitle, and the target playback time period covering the first moment at which the first instruction is obtained; and
obtaining a second instruction of the target account for information sharing;
in response to the obtained second instruction:
determining a to-be-shared first subtitle among the plurality of subtitles; and
sharing at least the still of the target video overlaid with the current subtitle and the first subtitle with at least another account of the social networking platform.

20. The non-transitory computer readable storage medium according to claim 19, wherein the plurality of operations further comprise:
while displaying the plurality of subtitles on the client:
obtaining a third instruction of the target account, the third instruction being used for indicating to-be-shared first media information; and
in response to the obtained third instruction, determining the to-be-shared first media information among a plurality of pieces of media information, and the plurality of pieces of media information being information used for representing content in the target video.

* * * * *